Figure 1:
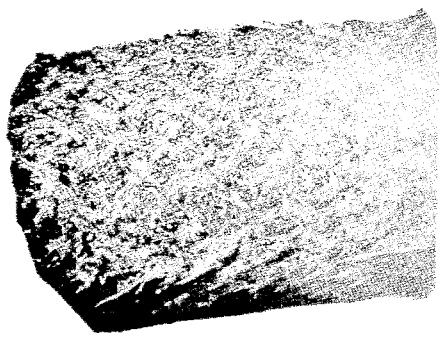

Oct. 18, 1955     N. D. CHERONIS     2,721,145
DEPOSITION OF POLYMERS INTO LEATHER

Filed Feb. 23, 1952

*INVENTOR.*
NICHOLAS D. CHERONIS
BY
*Wallenstein & Spangenberg*
*Attys*

2,721,145

DEPOSITION OF POLYMERS INTO LEATHER

Nicholas D. Cheronis, Brooklyn, N. Y.

Application February 23, 1952, Serial No. 273,123

18 Claims. (Cl. 117—55)

My invention relates to the treatment of leather with certain emulsions containing resinous or elastomeric polymers and it is also concerned with the production of particular emulsions which are especially efficacious for such use.

Broadly, the treatment of leather with emulsions of resinous or elastomeric polymers is well known. In accordance with such procedures, various types of monomers or mixtures of monomers are polymerized according to well known methods, for example, by emulsion polymerization procedures, to produce stable emulsions of resins or elastomers containing, for example, up to 50% of solids. Such emulsions, which are commercially available, are used in the leather industry essentially as surface finishes and they are, for all practical purposes, incapable of functioning otherwise in the field of leather treatment. When leather is subjected to treatment with such emulsions, for example, in a conventional mill, only a relatively small portion, at best, of the emulsion passes into the deep inter-layers of the leather where, upon drying, the water evaporates and the resins or elastomers are deposited on the inter-fibers and fibriles. The major part, and, in most cases, substantially all, of the resins or elastomers present in the emulsion are deposited on the outer surface of the leather where they function to impart a smooth finish to the leather. Typical of known practices in this regard are those described, for example, in British Patent No. 533,313, and by Fisher and Mast, Inc., Eng. Chem. 36, page 1027 (1944). As disclosed in the latter publication, for example, emulsions of ethyl acrylate, prepared according to the directions described therein, show markedly incomplete absorption, for example, 40% to 60%, by horsehide previously chrome-tanned and partially fat-liquored, when said horsehide was tumbled with such emulsion in a leather mill for one hour. Furthermore, the water vapor permeability of such leather was very adversely affected, falling to between 400 and 500 grams of water per square meter/24 hours.

In accordance with my present invention, emulsions of such character, containing resinous or elastomeric polymers, are produced that, when tumbled, for example, in a leather mill with the hide, after the latter has been tanned and subjected to certain additional preliminary treatments, all as described in detail below, will discharge completely or substantially completely, depositing all or substantially all of the polymers in an oriented manner throughout the inter-fiber spaces of the leather and with little, if any, deposition on the surface of the leather. The resinous or elastomeric polymers, although deposited deeply into and throughout the inter-fiber spaces of the leather, do not serve to close the inter-fiber spaces. Hence, pursuant to the practice of my invention, the water vapor permeability of the leather is not adversely affected nor reduced sufficiently so as to interfere with the satisfactory use of the leather for such purposes, as for example, the manufacture of shoes or gloves. In this connection, it may be observed that commercially available glove leather has a water vapor permeability of approximately 1200 to 2000 grams of water per square meter/24 hours at 35-36 degrees C. and 95% relative humidity, as measured by accepted methods of the American Leather Chemists Association. If the water vapor permeability of a glove leather is diminished much below 400 grams of water per square meter/24 hours at 35-36 degrees C. and 95% relative humidity, such leather is rendered unsuitable for use in gloves because of the discomfort to the wearer. In illustrative cases, leather treated in accordance with my invention showed water vapor permeability of from 800 to 1400 grams per square meter/24 hours at 35-36 degrees C. and 95% relative humidity.

With further regard to my invention, the emulsions containing the resinous or elastomeric polymers are so prepared, and the leather which is to be treated with such emulsions is given such initial treatment, that the result is produced, as stated above, of depositing, in an "oriented," as distinguished from "random," manner, all or substantially all of the polymeric particles substantially throughout the inter-fiber spaces of the leather with little or no deposition on either the surface of the leather or on the inner sides of the tumbling mill or like equipment which may be employed in the treatment of leather with my emulsions. Leather treated in accordance with my invention is materially improved with respect to its wear resistance and water resistance and without undue adverse effect on the water vapor permeability of the leather and without material effect on the flexibility, appearance, feel and other desired and accepted physical characteristics for the various types of leather which can be treated in accordance with my invention.

The practice of my invention brings about a number of important advantages in addition to those which have been set forth above. Thus, for example, it makes possible the production of good quality leather out of initially poor hide stock, converting such areas as the belly, breast and neck portions into leathers substantially as good as the back areas. It makes possible the production of glove leather and upper leather from hides which are not at present used for such purposes, typical examples being the utilization of cow bellies and goatskins and sheepskins for the production of fine glove leathers.

In the practice of my present invention, the polymers are deposited within the inter-fiber spaces of the leather in an oriented as distinguished from a random or agglomerate manner. This is a matter of substantial importance since the manner in which polymers deposit within the inter-fiber spaces of the leather very materially affects the water vapor permeability, aging characteristics and other properties of the leather. In the usual stuffing procedures, for example, by tumbling a hot fatty mixture with the leather or by treating the leather with an organic solvent solution of the fatty substances to be deposited in the leather, the fatty material deposits within the leather in random or agglomerate fashion which may roughly be characterized as comprising haystack-like deposits or deposits which have hills and valleys therein. Such leathers exhibit low water vapor permeability. Their initial resistance to the passage of water is high, but, through constant flexing due to usage, breakdown of the fatty material film occurs with resulting "channeling," that is, there is a migration of the fatty material and channels are formed within the leather through which water readily passes. When leather is flexed, an aging action occurs. The chief controlling factor appears to be the grease content of the leather. As the flexing continues, the grease, in spots or areas where the flexing is constantly in one direction, is forced out of the leather, the flex life is decreased, and elongation and crackiness occur.

In accordance with my present invention, there is a relatively slow discharge of the polymer from the emulsion and the deposited polymer is of oriented character, being evenly and uniformly distributed, a distribution which may be likened to that of a uniform film.

The deposited polymer remains in position and does not migrate through flexing of the leather during use. The practical effects and advantages of such oriented deposition are that the water vapor permeability is very greatly enhanced over a leather in which the deposition is random, flexing does not rupture the polymer film, and said film reconstitutes itself after distortion. Channeling does not occur and crackiness and aging are diminished and the life of the leather increased.

It should also be noted that, in the case of my invention, the deposited polymers form a bond or bridge therebetween and the protein lattice of the leather. This results in anchoring the deposited polymer within the leather. Migration of said polymer is, therefore, absent or substantially so. Moreover, the deposited polymers are inert or substantially inert toward the leather and undergo relatively little change in solubility or deterioration on aging. This is, for example, in sharp contrast to the results obtained by conventional stuffing and fat-liquoring of leather.

The teachings of my present invention are applicable to the treatment of all types of tanned leathers as, for example, leathers tanned by mineral tannages such as chrome, zirconium, titanium, etc.; leathers tanned by vegetable tannages such as quebracho, chestnut, and mixtures of vegetable extractives commonly used in tanneries for the production of vegetable tanned leathers; leathers tanned by mixtures of vegetable and mineral tannages, such as "chrome-vegetable retan upper leather"; leathers tanned by synthetic tannages such as "Orotan," "Politan," and other synthetic tannages; or leathers treated by mixtures of any two or more of the aforesaid tannages.

I have found, in accordance with my present invention, that the previous history and preliminary treatment to which a particular tanned leather is subjected plays an important part in the nature of the results which are obtained when such leather is subjected to treatment with the emulsions containing the resinous or elastomeric polymers which are intended to be deposited within the iner-fiber spaces of the leather. Thus, for example, after the tanning treatment, the pH of the leather should be adjusted, for example, by standard methods of tumbling with weakly alkaline salt solutions, to within a range of approximately 3 to approximately 5.5 and, especially, to a pH within the range of about 3.8 to about 4.5. I have found that, if the leather, at the time of treatment with the emulsion of the resinous or elastomeric polymers, has a pH below 3, the deposition of the resinous or elastomeric polymers into the leather is too rapid. At a pH of 6 or more, the deposition is too slow and, furthermore, such leather has undesirable characteristics.

After the pH adjustment, the leather should be preconditioned by depositiing thereinto several per cent, generally, about 3% to about 5%, of a mixture of sulfated (or sulfonated) and non-sulfated (or non-sulfonated) vegetable or animal oils or mixtures thereof. Thereafter, for best results, the leather is washed, drained, rolled wet and allow to remain in a wet condition for approximately one to three days. The wet leather is then treated with an aqueous emulsion of the resinous or elastomeric polymers, prepared as described in detail hereinbelow, so as to deposit within the inter-fiber spaces of the leather from about 5% to about 40%, as desired, of the resinous or elastomeric polymers, said percentage being based on the weight of the dry leather. The thus treated leather is then cured, in those cases where further polymerization of the resinous or elastic polymeric materials is desired. The final treatments are those which are usually employed in accordance with standard finishing operations, modified to such extent as appears to be indicated in the light of the fact that the resulting leather is considerably more hydrophobic than is the case with ordinary leather.

The adjustment of the pH of the tanned leather to the desired pH range, as set forth above, is effected by washing the leather after it has been tanned, for example, chrome-tanned, the washing being effected initially with water and then with sufficient of a dilute aqueous solution of an alkaline salt such as sodium bicarbonate, ammonium bicarbonate, sodium borate, or the like until the pH is within the desired range. With the usual chrome-tanned leathers, for example, about 0.15% to 1% of ammonium bicarbonate, based on the weight of the wet leather containing 60% of water, is sufficient. In a typical instance, a piece of wet leather was passed through a wringer whereupon the leather which issued therefrom and which, after being wrung out, weighed 1000 grams, contained 400 grams of dry leather. An aqueous solution made up of 1000 to 1500 grams of water and 2 grams of ammonium bicarbonate was utilized to tumble the leather for a period of 20 to 40 minutes whereupon the leather was removed and washed with water.

The pH of the leather may be determined in accordance with procedures which are known in the industry. Thus, for example, enough of a sample of wet leather, equivalent to 10 grams of dry leather, is cut into small pieces and suspended in 100 ml. of distilled water and allowed to stand therein for 24 hours. The pH of the water is determined by a pH meter or by the utilization of indicators and gives a good indication of the average pH of the leather, it being understood, in this connection, that the pH of the outer layers of a piece of leather may be different from the pH of various of the inner layers.

After the adjustment of the pH of the leather, and prior to the pre-conditioning step, whereby the leather is subjected to the mixture of the sulfated and non-sulfated animal or vegetable oils, the leather should be washed with water in order to free it to the extent reasonably possible from water-soluble salts. In this general connection, it should be understood that, as the leather goes through the usual tanning operations, various inorganic salts which are present in the wet hide tend to combine with the proteins or certain of the proteins in the leather. It is generally assumed that the mineral and vegetable tannages are firmly bound to the protein molecules. There are present, however, water-soluble adsorbed or loosely chemically bound salts or tannins and the presence of these, it has been found, tends to bring about an unduly rapid breaking or discharge of the emulsions of the resinous or elastomeric polymers, with which it is intended that the pre-conditioned leather be subsequently treated, with the result that only surface deposition or deposition mostly at the inner sub-surface layers of the leather, as contrasted with deposition substantially throughout the thickness of the leather, takes place. It is, therefore, important, in those cases where there is an appreciable amount of water-soluble adsorbed salts or tannins present in the leather, to remove, or substantially remove, them by washing or tumbling with water.

After the above washing operation, the leather can be dyed in accordance with usual practices but, in this connection, consideration should be given to the nature of the dyes and mordants that are used because of their possible effect on the nature of the subsequent treatments to which the leather is to be subjected in accordance with my invention. Thus, for example, dyes and mordants should not be used which tend to have an unduly rapid discharge effect on the emulsions containing the resinous or elastomeric polymers. This can readily be determined experimentally after dyeing the leather. The absence of appreciable proportions of water-soluble salts or electrolytes is one of the desiderata with which the process of my present invention is concerned, and the removal of the excess water-soluble salts is important if the best results are to be obtained in accordance with my invention. In general, amounts of water-soluble salts of the order of 500 to 1000 mg. per 100 grams of dry leather will cause too rapid an exhaustion of the emulsion. Where the content of water-soluble salts or electrolytes in the leather is of the order of 50 to 80 mg. per 100 grams of dry leather, good results are obtained. The determination of the content of inorganic water-soluble salts is readily carried out by cutting, into fine pieces, a section of leather corresponding to the 5 grams of dry leather and suspending said fine pieces in 100 grams of water over-night. Alternatively, the suspension may be shaken for 3 hours. In either case, the suspension is then filtered, washed to make 100 ml., the residue determined on an aliquot part, and the pH taken on another part. The residue, after weighing, is ignited and the inorganic soluble salts are thus determined.

In carrying out the pre-conditioning step, the leather is subjected to an emulsion of a sulfated (sulfonated) vegetable or animal oil, especially a mixture of sulfated (sulfonated) and non-sulfated (non-sulfonated) vegetable or animal oil, so as to deposit in the leather several per cent, for example, 3 to 5%, by weight, of said oils or a mixture of said oils, based on the weight of the dry leather. In the case of general purpose leathers, the aforementioned percentages of sulfated oils are quite satisfactory. In the case of certain leathers, such as glove leathers, where exceptionally high flexibility is desired, the amount of sulfated or sulfated and non-sulfated oils which are incorporated into the leather can be materially higher as, for example, of the order of about 8 to 12%, by weight, on the dry leather. It is preferred to utilize sulfated oils having an $SO_3$ content above 2.5% and less than 4.5%. Where mixtures of sulfated (sulfonated) and non-sulfated (non-sulfonated) oils are used, the amount of the non-sulfated oils, for best results, should not be more than half the weight of the total amount of oil used. The sulfated oil or a mixture of oils is stirred into sufficient water to make a weak dispersion, for example, 1% to 4% of oil, and then the leather is tumbled in a mill or otherwise subjected to the action of the sulfated oil emulsion until the emulsion is exhausted or substantially exhausted. Thereupon, the leather is washed with water, drained, and preferably rolled in the wet stage and allowed to stand for about 1 to 3 days at which time it is then ready for treatment with the emulsion containing the resinous or elastomeric polymers. While various vegetable and animal oils can be used, I find it particularly advantageous to employ sulfated neat's-foot oil, sulfated castor oil, sulfated cod oil or mixtures thereof. It has been found that if this pre-conditioning step is not utilized the subsequent treatment with the emulsions containing the resinous or elastomeric polymers will result in either no deposition of the resinous or elastomeric polymeric materials in the inter-fiber spaces of the leather or the deposition will be poor and non-uniform and the exhaustion of the resinous emulsions incomplete. It has also been found that the preconditioning treatment permits the leather to be dried, if desired, and then re-wetted before subjecting it to the emulsion containing the resinous or elastomeric polymers. Unless this pre-conditioning treatment is utilized, if the leather, prior to treatment with the emulsion of the resinous or elastomeric polymers, is permitted to dry, it cannot be re-wetted readily and if it does become re-wetted the fibers seldom come back to their original state and an unsatisfactory leather results.

I find it particularly advantageous to deposit the elastomeric material into the inter-fiber spaces of the leather in the form of partial or incomplete polymers although, in the broader phases of my invention, a fully polymerized elastomeric material can be deposited, with reasonably satisfactory results, into the inter-fiber spaces of the leather. Where partial polymers are utilized, it is especially advantageous to prepare the same by polymerizing the monomer or mixtures of monomers by mass polymerization to a low molecular weight, most advantageously in the range of about 3000 to about 8000, then arrest the polymerization by the addition of a volatile amine, such as n-butylamine, and a volatile organic non-polar solvent, such as xylol, and then emulsify said solution and the other ingredients in water to form the emulsion proper. The partial polymers produce superior orientation in the leather than is the case with initially fully polymerized elastomers, and agglomerate deposition and channeling effects are avoided. The result is to produce a leather which retains its desirable properties over long periods of time even under severe conditions of use.

Where partial polymers are deposited, the leather is subsequently subjected to a curing treatment. In general, curing is effectively accomplished by means of heat, for example, a temperature of about 140 degrees F. for about 48 hours. Where certain types of partial polymers are utilized, for example, the alkylene polysulfides or mixtures of resins having oxidizable oil (such as oiticica and China wood, which have been heated for ¼ to ½ hour at temperatures of the order of 200–250 dgrees C.), curing agents can effectively be utilized as, for example, various hydroperoxides such as cumene hydroperoxide or mixtures thereof with diphenylguanidine. Good results are obtained, in such cases, with about 3% of cumene hydroperoxide and about 0.5% of diphenylguanidine, said percentages being based on the weight of the solid polymer deposited within the leather. The curing agents are dissolved in an organic solvent, such as toluene or xylene, and are then emulsified in the manner described herein. A typical example of a cumene hydroperoxide emulsion is one containing, by weight, 18 parts cumene hydroperoxide, 6 parts diphenylguanidine, 6 parts of an emulsifying agent such as "Permasol" base, 30 parts xylol, and 1500 parts water. After the leather has been fully treated in accordance with the procedure disclosed to deposit the partial polymers in the inter-fiber spaces of the leather, the leather is subjected to treatment with the curing agent while the leather is still in the wet condition. In practice, after the spent liquor is removed subsequent to the emulsion treatment, water is added and the hide is washed. Then the water is withdrawn and a small amount of the emulsion in which the curing agent is dispersed is added. The mill is then tumbled for about 5 minutes which is usually sufficient to exhaust the emulsion of the curing agent. The spent liquor is then withdrawn and the leather is again washed with water. It is then hung in a hot room and allowed to remain for about 48 hours. For certain types of leathers, such as upper leather, the curing is preferably done during the pasting operation. Thus, the leather, while it is still in the wet condition, is pasted on metal drums or plates and then subjected to heat, such pasting and heating operations being standard procedures per se. Where leathers have been treated in accordance with my present invention, however, the pasting agent should be changed since the leather is very hydrophobic due to the presence of both the polymer and the organic solvent which were present in the emulsion.

Various types of polymers can effectively be deposited into the inter-fiber spaces of the leather by the practice of my present invention. Typical examples of such polymers are acrylate or methacrylate partial polymers such as those prepared from methylacrylate, ethylacrylate, butylacrylate, methyl methacrylate, ethyl methacrylate, butyl methacrylate, and mixtures of said acrylates and methacrylates; silicon resins; alkylene polysulfide elastomeric materials such as the various "Thiokol" polymers; polythene and nylon polymers; copolymers of mixtures of monomers such as styrene or chlorostyrene with vinyl chloride, vinyl acetate or vinylidene chloride; polymers of the synthetic rubber type such as the polydiene and acrylate rubbers and, in general, any type of resinous polymer which is soluble in a non-polar solvent, or in a polar solvent wherein the resulting solution is soluble in a non-polar solvent to produce solutions containing at least as much non-polar solvent as polar solvent.

The type of elastomer or polymer utilized for deposition into the inter-fiber spaces of the leather and the extent of the inter-deposition are governed, in part, by the specific results sought to be obtained. Thus, for example, where a high resistance to abrasion is sought, the alkylene polysulfide polymers, such as the "Thiokols," are especially effective when deposited into the leather in amounts of the order of 30% to 35% or more. If a high degree of water-repellency is the desideratum, the methacrylate partial polymers and silicones are particularly desirable although, per se, they add little by way of strength to the leather. Where combinations of the "Thiokols" and the methacrylates, for example, are utilized, they should be separately emulsified and then combined in order to obtain the best results. Where synthetic rubber latices are utilized, a deposition of 20% of such latices solids represents good practice.

In order for effective deposition of the partial polymers into the inter-fiber spaces of the leather to take place, the emulsified particles must be able to slip between the inter-fiber spaces in the leather and said emulsified particles must become discharged whereby deposition of the partial polymer takes place. A significant, if, indeed, not the principal, factor which determines the charge on the emulsified particles is the emulsifier or emulsifying composition which is employed. Another contributing factor is the nature of the polymer or elastomer which is utilized. The electric charge on the emulsified particles of the polymer bears an important relationship to the character of the particular leather which is being treated, the character of such leather being controlled, as previously pointed out, by the prior treatment to which it has been subjected and particularly by the type of tannage used in producing the leather.

The emulsifier selected plays a significant role in the practice of my present invention if the most advantageous results are to be obtained therefrom. The type of emulsifying agent or mixture of agents to be utilized depends upon the nature of the leather to be treated, particularly in relation to the type of tannage to which the leather has previously been subjected in the manufacture thereof. Generally speaking, in the case of vegetable tanned and vegetable re-tanned leathers, for example, the usual upper leather and sole leather, the nonionic types of emulsifiers should be employed. In the case of chrome-tanned and mineral-tanned leathers, such as horse fronts utilized for gloves, mixtures of nonionic and anionic emulsifiers, or mixtures of nonionic and cationic emulsifiers, are particularly satisfactory. In such latter mixtures, the ratio of the nonionic to the anionic or cationic emulsifiers may be in the range of about 1 of the former to about 2 to 2½ of the latter but it is particularly preferred to employ the nonionic and anionic or cationic emulsifiers in a ratio of about 1 to 1. Good results are also obtained, with chrome-tanned and mineral-tanned leathers, by the use of certain cationic emulsifiers without the concomitant use of nonionic emulsifiers.

Among the various nonionic emulsifying agents which can be employed in the practice of my invention are, for example, higher fatty acid partial esters of glycols and other aliphatic polyhydric alcohols or polyhydroxy substances, typical examples of such glycols and other aliphatic polyhydric alcohols being ethylene glycol, diethylene glycol, propylene glycol, triethylene glycol, glycerol, polyglycerols, pentaerythritol, polypentaerythritols, sorbitol, mannitol, dulcitol, arabitol, mannide, sorbide, etc. The higher molecular weight fatty acids whose partial esters of the aforesaid polyhydric alcohols are utilized in the production of the nonionic emulsifying agents are those containing preferably from 12 to 18 carbon atoms as, for example, lauric acid, myristic acid, palmitic acid, oleic acid, stearic acid, and mixtures of such acids, such as are derived from animal and vegetable oils and fats.

The corresponding higher molecular weight aliphatic alcohol ethers of said polyhydric alcohols are also illustrative of nonionic emulsifying agents which can be used in accordance with my invention.

A still further type of such nonionic agents comprises phosphoric derivatives of polyethylene glycol and alcohols of medium chain length which may be represented by the formula:

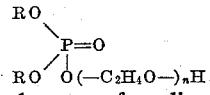

where R is an alkyl group of medium chain length, for example, from about 6 carbon atoms to about 10 carbon atoms, and $n$ is an integer from 2 to about 10. A typical example of this latter type of nonionic emulsifying agent is that sold under the trade name "Victawet 12."

Specific examples of the aforementioned nonionic emulsifying agents are glycerol monolaurate, glycerol monostearate, glycerol monooleate, sorbitan monolaurate, sorbitan monostearate, sorbitan monopalmitate, sorbitan monooleate, sorbitol monolaurate, mannitan monolaurate, mannitan monooleate, mannitan monopalmitate, mannide monooleate, diglycol monostearate, diglycol monolaurate, diglycol monooleate, pentaerythritol monostearate, pentaerythritol monooleate, pentaerythritol monolaurate, propylene glycol monooleate, propylene glycol monostearate, polyoxyalkylene ethers and thioethers including such derivatives of phenols and of higher fatty acid partial esters such as those sold under the trade names "Carbowax" esters, "Tweens" 40, 60, 61, 80, 81 and 85, "Sterox SK," and "Triton X–155."

Illustrative examples of anionic types of emulsifiers which can be used in accordance with the present invention are sulfated neat's-foot oil, sulfated cod oil, sulfated castor oil, mahogany acid sulfonates; sulfated higher molecular weight alcohols such as lauryl alcohol sulfate, cetyl alcohol sulfate, and oleyl alcohol sulfate, in the form of their sodium salts; the "Aerosols" such as the dioctyl ester of sulfosuccinic acid, sodium salt; the higher alkylated phenol polyoxyethylene ether sulfonates exemplified by the products sold under the trade names "Triton X–200" and "Triton X–400"; and the sulfates of higher molecular weight branched chain alcohols such as are sold under the trademark "Tergitol."

Illustrative examples of cationic emulsifiers which can be utilized in accordance with my present invention are the quaternary ammonium compounds represented by the formula

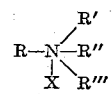

wherein R is an open chain high molecular weight alkyl radical, preferably containing from 12 to 18 carbon atoms; R′, R″ and R‴ are the same or dissimilar short chain alkyl radicals such as methyl, ethyl, propyl, isopropyl and butyl, or together form a heterocyclic radical such as pyridine, quinoline or quinaldine; and X is an anion, particularly chlorine, bromine or iodine. Typical of such quaternary ammonium compounds are stearyldimethylbenzyl ammonium chloride, oleyltrimethyl ammonium chloride, lauryldimethylbenzyl ammonium chloride, dilauryldimethyl ammonium chloride, and cetyltrimethyl ammonium bromide.

Typical examples of emulsifier compositions which are especially satisfactory for use in connection with the treatment of leathers which do not contain vegetable tannins are the following, the parts being by weight:

|  | A | B | C | D | E | F | G | H | I |
|---|---|---|---|---|---|---|---|---|---|
| Glycerol monostearate | 40 | 40 | 35 | 50 | 25 | 30 | 35 | 0 | 20 |
| Sulfated neat's-foot oil (2.5 to 3% SO₃) | 28 | 28 | 30 | 20 | 40 | 30 | 30 | 25 | 25 |
| Sulfated cod oil | 2 | 2 | 0 | 0 | 10 | 0 | 5 | 25 | 25 |
| Sulfated castor oil | 0 | 0 | 0 | 10 | 0 | 0 | 0 | 0 | 0 |
| Petroleum sulfonate | 0 | 0 | 30 | 10 | 25 | 20 | 30 | 0 | 0 |
| "Tergitol" paste (50%) | 20 | 20 | 5 | 10 | 0 | 20 | 0 | 0 | 10 |
| "Triton-200" | 0 | 10 | 0 | 0 | 0 | 0 | 0 | 0 | 0 |
| "Permasol" base (E. F. Houghton & Co.) | 10 | 0 | 0 | 0 | 0 | 0 | 0 | 50 | 20 |

Typical examples of emulsifying compositions which are especially satisfactory in connection with the treatment of leathers which have been tanned either wholly or in part by a vegetable tannin are as follows:

|  | J | K | L | M | N | O |
| --- | --- | --- | --- | --- | --- | --- |
| Glycerol monostearate | 50 | 40 | 0 | 10 | 0 | 0 |
| Glycerol distearate | 10 | 0 | 0 | 0 | 0 | 0 |
| Glycerol monooleate | 20 | 20 | 0 | 10 | 0 | 0 |
| Diethylene glycol monostearate | 0 | 40 | 0 | 5 | 0 | 0 |
| "Victawet #12" | 20 | 0 | 100 | 75 | 0 | 50 |
| "Triton X-155" (Alkyl polyether alcohol) | 0 | 0 | 0 | 0 | 100 | 50 |
| "Triton K-60" (Octadecyldimethylbenzyl ammonium chloride) | 0 | 0 | 0 | 0 | 0 | 100 |

The amount of the emulsifying agent or emulsifier composition utilized in the emulsion is based, in general, on the total amount of polymer utilized in the emulsion. In general, satisfactory results are obtained with proportions of emulsifier in the amount of 3% or 4% to 10%, based on the weight of the polymer, a percentage of about 6% to 8% representing a good average.

Among the various plasticizers or mixtures thereof which can be utilized in the practice of my invention are, for example, paraffin oil, paraffin wax, castor oil, neat's-foot oil, tricresylphosphate, dibutylphthalate, tristearin, dioctyl phthalate, dimethylphthalate, diethylphthalate, diphenylphthalate, tributylphosphate, dibutyltartrate, diamyltartrate, triphenylphosphate, methylphthalyl ethyl glycolate, polybutenes of molecular weight 600 to 2000, triacetin, tripropionin, and the like.

In order to obtain fully satisfactory results, the amount of total organic solvent utilized in the emulsion should be controlled. Generally speaking, a lower limit of 10% and a higher limit of 40% represent the broadest range of the amount of organic solvent which can be utilized based upon the total volume of the emulsion. In usual practice, it is advisable to employ from about 20% to about 30% of organic solvents, based on the volume of the concentrated emulsion. When this concentrated emulsion is diluted with water for use in the treatment of the leather as disclosed below, it will be noted that the amount of organic solvent present in the emulsion as used is advantageously in the general range of about 3% to about 5%.

In the preparation of the emulsion, the polymer is usually initially dissolved in an organic non-polar solvent. It is important, in the practice of my present invention, that the organic solvent which is utilized be at least one-half and, more advantageously, predominantly of a non-polar type. In many instances, the entire organic solvent is of the non-polar type. In certain cases, however, mixtures of organic solvents wherein the non-polar solvent is present in predominating proportions gives satisfactory results. Thus, for example, if a polymer of the nylon type or vinyl resin type is to be deposited in the leather, a solution of such polymer in methanol or methyl ethyl ketone, for example, could not be effectively employed in the practice of my invention since, among other things, such a solution cannot properly be emulsified. However, in such case, the nylon or vinyl type of polymer can initially be dissolved in an alcohol, such as amyl alcohol or hexyl alcohol or alcohol and a ketone such as methyl ethyl ketone, and then the resulting solution can be admixed with an equal or somewhat greater amount of a non-polar solvent, such as toluene or xylene, and the resulting solution then emulsified in accordance with the teachings of my present invention.

In preparing the original concentrated emulsion, considering, for example, one typical case, approximately 20 parts of the polymer is dissolved in approximately 25 to 30 parts of the non-polar organic solvent. Then approximately 1 to 2 parts of the emulsifier, dissolved in water, is added after which the water is added to make a total of about 100 parts and the entire mass is then passed through a colloid mill. After standing for about 12 to 24 hours, the emulsion is advantageously again passed through the colloid mill. This emulsion may be stored for long periods of time and retains its stability under ordinary conditions. However, care should be taken to avoid the subjection of the emulsion to freezing temperatures since, upon freezing, the emulsion breaks and, in such form, is inoperable.

Prior to use, such concentrated emulsion is diluted with an appropriate amount of water, preferably hot water, so that the temperature of the diluted emulsion is brought to about 60 degrees C. at which temperature it is added to the mill when the treatment of the leather is to be effected. The extent of dilution is, in general, in the range of about 4 to about 8 parts of water for each part of the undiluted emulsion, a particularly preferred range being 5 to 7 parts of water to 1 part of the undiluted emulsion. A good operating diluted emulsion is one containing from about 2%, and, more advantageously, from about 3% to about 5%, by weight, of solids, about 90% to 95% water, about 3% to 5% volatile organic solvent, 0% to 1.5% plasticizer, and about 0.4% to 0.7% emulsifier. A sample A of the diluted emulsion is taken before and then another sample B is taken after the mill or tumbling operation. The solids are determined in the A and B samples and $$\frac{\text{Solids } A - \text{solids } B}{\text{Solids } A} \times 100$$

gives the percent of deposition provided, of course, that there is no deposition on the side of the mill and on the surface of the hide.

The pH of the diluted emulsion should fall within about 6 to 6.5 to about 8 for best results. If the pH is higher than about 9, the emulsion breaks or exhausts too slowly or not at all; or, if the leather is too acid, for example, pH below 3, the emulsion deposits suddenly on the surface. The pH of the emulsion can be adjusted by careful addition of a suitable acid, for example, formic acid, to lower the pH or by the addition of dilute sodium hydroxide or of an amine, for example, ethyl amine, to raise the pH.

The concentrated emulsion may contain from about 10% to about 30% of the elastomer, particularly in the form of a partial polymer (or copolymer), from 0 to 10% of the plasticizer, from 0.5% to 3% of the emulsifier, from about 20% to about 35% or 40% of a non-polar organic solvent or a mixture of organic solvents containing at least and preferably greater than 50% of non-polar solvent, and 40% to 60% of water. A particularly preferred range is from 15% to 20% of the elastomer, from 0 to 5% of the plasticizer, from 1% to 2% of the emulsifier, from 20% to 30% of the organic solvent, and from 48% to 55% of water. A specific emulsion, in undiluted form, which has been found especially effective comprises about 17% of elastomer, about 3% plasticizer, about 1.6% emulsifier, about 25% solvent, and about 53.4% water. All such percentages are by weight.

When wet leather is tumbled in the leather mill (which mill may be made of wood or metal or glass or a plastic material, especially wood) with the emulsion, good operation is indicated by the following:

The emulsion is milky when initially added to the leather. During the tumbling operation, as may be observed through a window in the mill, the emulsion begins to fade very slowly in good and desirable mill operation. After about 10 to 15 minutes it shows the initial breaking streaks and thereafter it slowly loses the milkiness and streaks the window in a manner entirely different than occurred initially. After about 30 to 40 minutes, the emulsion has broken and becomes largely or completely exhausted. In other words, all or substantially all of the polymer has left the aqueous-solvent phase and has been deposited within the leather. In general, by the time that the emulsion has broken completely, the water phase will have a clear or almost clear appearance. On opening the mill, there will be no deposit on the sides of the mill nor on the surface of the leather. In the usual case, more water is found in the drum as spent liquor than was present in the emulsion. This indicates clearly that the emulsified particles slip within a water pathway into the leather and there discharge, depositing the solids of the emulsion as well as at least most of the organic solvent. In other words, there is an exchange of materials, water coming out of the leather and the organic matter being deposited therein in place of said water. This is to be distinguished sharply from certain prior art practices where leather has been treated with emulsions. In such prior art practices, some of the emulsion penetrates and remains unbroken within the leather. The resulting leather, when cut by a knife or squeezed, shows the presence therein of a milky emulsion. When such leather is dried, the emulsion breaks by evaporation of water therefrom and some small deposition results, but it is impossible by such known practices, to deposit appreciable amounts of polymers within the interfiber spaces of the leather.

The following examples are illustrative of the practice of my invention. It will be understood, of course, that various changes may be made in the light of the guiding principles disclosed without departing from the novel teachings set forth therein.

*Example 1*

(a) A piece of undyed horsehide weighing 768 grams on a dry weight basis which had been chrome-tanned and neutralized to pH 3.85 was fat-liquored so as to deposit in said hide 28 grams of sulfated neat's-foot oil and 3 grams of sulfated castor oil. The hide was then washed, drained, rolled wet and allowed to remain rolled and wrapped in water-proof paper for 2 days. It was then placed in water at room temperature overnight. The hide was brought to a temperature of 55–60 degrees C. by tumbling in a leather mill with hot water for 30–40 minutes and the water then was drained off.

(b) 369 grams of an alkylene polysulfide polymer ("Thiokol LP–2" polymer, Thiokol Corporation, Trenton, New Jersey) were dissolved in 338 grams of toluene and 338 grams of xylene. To this solution 81 grams of polymerized isobutene plasticizer ("Indopol L–100," Indoil Chemical Products Co., Wood River, Illinois) were added. In a separate container 31.5 grams of an emulsifier (glyceryl monostearate, 40 grams; sulfated neat's-foot oil, 28 grams; 7-ethyl-2-methyl-undecanol-4-sulfate, 22 grams; petroleum sulfonate, 10 grams) were melted and then dissolved in 1193 grams of warm water. The two solutions were then mixed and the whole mixture was passed through a colloid mill at 11,000–12,000 R. P. M. This gave 2350 grams of emulsion of approximately 20% solids with a pH of 8.15.

(c) The leather, prepared as described in part (a) hereof, and 960 grams of the emulsion, prepared as described in part (b) hereof, said 960 grams of emulsion first being diluted with 1200 grams of water and heated to 60 degrees C., were tumbled for 60 minutes in a leather mill having 24–28 revolutions per minute. After 10 minutes, there was a gradual exhaustion. At the end of 60 minutes 1 ml. of formic acid was added to the spent liquor in the mill and the hide allowed to tumble with the spent liquor for another 10 minutes. The hide was then removed from the mill. No deposit was noted either on the surface of the leather or on the sides of the mill. The hide was washed by immersing in water. Then it was cured by means of a cumene hydroperoxide emulsion as described above. Then the leather was staked and finished according to standard practice.

The total spent liquor of 2200 grams, which had a pH of 3.18, was analyzed. Of the total solids used in the original emulsion, 2 grams was left in the spent liquor or, in other words, 99% absorption was obtained, or a deposition of about 38%. The distribution of the polymer was determined as follows: A piece of the finished leather was placed on a freezing microtome and sections of 50 micron thickness were made. These sections were bleached in a saturated solution of sodium peroxide for 2 minutes, then thoroughly washed in distilled water and then stained for ½ hour in Sudan IV (made by boiling Sudan IV in 70% alcohol and filtering out the undissolved dye). After the dyeing with Sudan IV the sections were counterstained for 3 minutes in Nile Blue Sulfate Solution (0.02% Nile Blue Sulfate in water) and then mounted on micro slides. On examination by a microscope the polymer appears as a red film distributed all over the fiber bundles. It was evenly distributed throughout without agglomerates or layer deposition, as is shown in Fig. 1 of the drawing.

The water vapor permeability of the leather was 1300 g. water/m.$^2$/24 hrs. or 93% of the untreated leather. The water repellency as measured by the Maeser Dynamic Water Penetration Machine (10,000 flexes in all of the examples) was 30% of water absorbed and transmitted. Untreated leather of the same type measured about 400–450% of water absorbed and transmitted.

*Example 2*

(a) A piece of horsehide weighing 616 grams on a dry weight basis which had been neutralized and dyed, was fat-liquored to deposit in the leather about 5% of a mixture containing 90% sulfated neat's-foot oil and 10% sulfated cod oil. After "crusting" the hide was wetted and preheated to 55–60 degrees C., as described in part (a) of Example 1.

(b) 247 grams of a silicone intermediate or partial polymer, prepared by the hydrolysis of n-amyl-trichlorosilane in the manner set forth below, were dissolved in 371 grams of xylene. In a separate container 22.5 grams of an emulsifier (25 parts of glycerol monostearate, 40 parts sulfated neat's-foot oil, 10% sulfated cod oil, 25% mahogany sulfonates) were melted and dissolved in 592 grams of warm water. The two solutions were mixed and the mixture was passed through a colloid mill at 11,000–12,000 R. P. M. The yield was 1232 grams of emulsion having a pH of 7.95 and a solids content of 20%.

(c) The emulsion of part (b) hereof (which contained 20% of the silicone intermediate polymer) was heated to 60 degrees C. and diluted with 1232 grams of water at 60 degrees C. and then added to the leather in the mill and tumbled for 1 hour. The emulsion exhausted gradually over the hour period of tumbling. The hide was removed from the mill. No deposit was noted either on the surface of the mill or on the surface of the leather. The hide was washed by immersing in water and then placed in a room at 55–60 degrees C. for 30 hours. Then the leather was staked and finished according to standard practice.

The total spent liquor was analyzed. The pH of the spent liquor was 4.0. No solids were left in the spent liquor. In other words, 100% exhaustion or deposition was obtained. The deposition in the hide was about 40%. The silicone resin was found by ashing sections taken through the leather to be substantially uniformly distributed or deposited throughout the leather. The water vapor permeability of the leather was 1500 g. water/m.$^2$/24 hrs. or 100% of untreated leather. The water repellency as measured by the Maeser Dynamic Water Penetration Machine was 12% of water absorbed and transmitted. Untreated leather of the same type measured about 400–450% water absorbed and transmitted.

To 800 cc. of water, 200 grams of normal amyl trichlorosilane were added slowly with continuous stirring. The temperature was kept at 50–60 degrees C. The mixture was allowed to stand at 50 degrees C. for 1 hour with stirring. The pH of the solution was brought to 7 by addition of 6 normal sodium hydroxide solution. The mixture was extracted with 200 ml. of xylol. The extract was filtered and dried over calcium chloride. The per cent of solids in the solution was determined. Hydrolysis can be carried out at lower temperatures, even as low as about 0 degrees C. Other solvents can be used such as, for example, ether, toluene or benzene. See, also, my Patent No. 2,568,384 for stable solutions of silicones which can be utilized in the practice of my present invention.

*Example 3*

(a) A piece of horsehide weighing 894 grams on a dry weight basis which had been chrome-tanned, neutralized, dyed was fat-liquored to the extent of about 4% as described in part (a) of Example 1 with a mixture containing 90% sulfated neat's-foot oil and 10% sulfated cod oil. After "crusting" the hide was wetted and preheated to 55–60 degrees C. in the manner described in part (a) of Example 1.

(b) 285 grams of an intermediate methacrylate polymer, prepared according to the method described below, were dissolved in 665 grams of xylene. To this solution 95 grams of a plasticizer (a mixture of equal parts of polymerized isobutenes, "Indopol L-100" and "Indopol H-50," Indoil Chemical Products Company, Wood River, Illinois) were added. In a separate container 31 grams of the emulsifier described in part (b) of Example 2 were melted and dissolved in 824 grams of warm water. The two solutions were mixed and the whole mixture was passed through the colloid mill as described in part (b) of Example 1. A total of 1900 grams of the emulsion was obtained, the pH of said emulsion being 8.55 and it contained 20% solids.

(c) The leather produced in part (a) hereof and 1790 grams of the emulsion produced in part (b) hereof were tumbled in a leather mill for 1 hour at a rotation rate of 24–28 R. P. M. The emulsion was exhausted gradually over said 1 hour period. The hide was removed from the mill. No deposit was noted either on the surface of the leather or on the sides of the mill. The hide was washed by immersing in water. Then it was dried, staked and finished.

Figure 2:
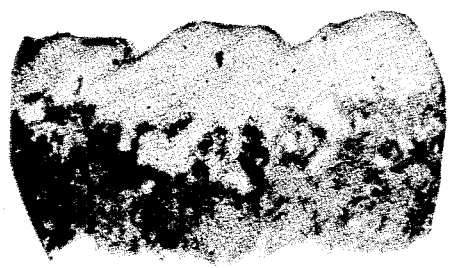

The pH of the spent liquor was 4.9, and, upon analysis of said spent liquor, no solid was recovered. Hence, the absorption of the polymer was 100%. A deposition of 40% was obtained. The distribution of the polymer was determined as follows: A piece of the finished leather was placed in a freezing microtome and sections of 50 microns were made. These sections were bleached in a saturated solution of sodium peroxide for 2 minutes, then thoroughly washed in distilled water and then stained for 3 minutes in phenylhydrazine reagent (made by dissolving 5 grams of phenylhydrazine in 50 ml. of 10% acetic acid and heating to 60 degrees C.). The section was then washed in distilled water and mounted on micro slides. Examination under the microscope showed the polymer as a yellow film on the surface of the fibers and in the interfiber spaces. It was evenly distributed throughout the leather without agglomeration, as shown in Fig. 2 of the drawing.

The water vapor permeability of the leather was 1000 g. water/m.²/24 hrs. or about 71% of untreated leather. The water repellency of the leather as measured by the Maeser Dynamic Water Penetration Machine was 6% of water absorbed and transmitted. Untreated leather of the same type measured about 400–450% of water absorbed and transmitted.

1200 grams of butyl methacrylate, 200 grams of methyl methacrylate and 600 grams of styrene were placed in a five-liter flask. A water-cooled condenser was attached to the large center opening, a thermometer inserted in one small opening, and the third opening was stoppered and used to introduce the catalyst. The flask and its contents were set in an oil bath and heated until the solution began to boil (about 120 degrees C.). The bath was removed and 2 grams of benzoyl peroxide were added slowly over a period of 30 minutes, keeping the temperature of the mass at 135–140 degrees C. After the addition of the catalyst, the solution was heated (135–140 degrees C.) for 2 hours whereupon it became converted to a thick syrup. A sample was removed which had a viscosity of 28.4 cps. for a 10% solution.

*Example 4*

A side of veal hide weighing 900 grams after chrome-tanning, neutralizing to pH 4.18 and dyeing black was fat-liquored with 27 grams of sulfated oils (80% neatsfoot oil and 20% castor oil) and then crusted in the wet stage for 48 hours. Then it was treated with 1350 grams of an alkylene polysulfide emulsion prepared as described in part (b) of Example 1 and diluted with 1500 grams of water. The diluted emulsion was heated to 60 degrees C. and added to the hide in the leather mill. The leather was allowed to tumble with the diluted emulsion for 50 minutes whereupon 2 ml. of formic acid were added and the tumbling was continued for another 10 minutes. At the end of the run the pH of the spent liquor was 5.1. The leather was washed in water by immersion, cured by use of a cumene hydroperoxide emulsion, and then pasted and finished as usual. The leather had a soft feeling after finishing.

The leather was examined microscopically after staining as in Example 1. This examination showed the polymer to be distributed throughout the leather in an even film which was slightly heavier near the flesh surface than in the rest of the leather.

The water vapor permeability of the leather was 656 g. water/m.²/24 hrs. The water repellency of the leather as measured by the Maeser Dynamic Water Penetration Machine was 45% water absorbed and transmitted. Untreated leather of the same type measured about 100–150% water absorbed and transmitted.

*Example 5*

A side of veal hide weighing 327 grams after chrome-tanning, neutralizing to pH 4.18 and dyeing black was fat-liquored with 10 grams of sulfated oils (80% neat's-foot oil and 20% castor oil) and then crusted in the wet stage for 48 hours. Then it was treated with 327 grams of a silicone emulsion prepared as in part (b) of Example 2 and which was diluted with 981 grams of warm water. The diluted emulsion was heated to 60 degrees C. and added to the hide in the leather mill. The leather was allowed to tumble with the emulsion for 1 hour at the end of which time the pH of the spent liquor was 5.15. The spent liquor was analyzed and 3 grams of solids were recovered. This showed that there was a deposition of 19.0% in the leather and that there was 95.5% absorption of the total amount of polymer used in the original emulsion.

The water vapor permeability of the leather was 750 g. water/m.²/24 hrs. The water repellency as measured by the Maeser Dynamic Water Penetration Machine was 40% water absorbed and transmitted. Untreated leather of the same type measured about 100–150% water absorbed and transmitted.

*Example 6*

(a) A side of goatskin weighing 355 grams on a dry weight basis which had been tanned with "Politan" synthetic tannage, neutralized to pH 4.5, undyed, was fat-liquored with 3.5% sulfated oils (80% neat's-foot oil, 10% castor oil, and 10% cod oil), and then crusted in the wet stage for 48 hours. After crusting the hide was wetted by placing in warm water for 24 hours, and then was brought to temperature of 55–60 degrees C. by tumbling in the leather mill for 30 minutes.

(b) 480 grams of an alkylene polysulfide polymer ("Thiokol LP-2" polymer) were dissolved in 480 grams of xylene and 480 grams of toluene. To this solution 160 grams of amyl silicone solids, made according to the method described in Example 2, were added. To the resulting solution 160 grams of a polymerized isobutene ("Indopol L-100") were added. In a separate container 64 grams of an emulsifier (same as used in part (b)

of Example 2) were melted and dissolved in 2176 grams of warm water. The two solutions were mixed and the mixture run through a colloid mill at 11,000–12,000 R. P. M. 2000 grams of emulsion having a pH of 7.55 were obtained.

(c) The leather produced in part (a) and 710 grams of the emulsion produced in part (b) hereof were tumbled for 1 hour. At the end of the hour the spent liquor was not clear and had a pH of 5.20. All of the spent liquor was analyzed. Of the solids used in the emulsion 2 grams were recovered from the spent liquor. This showed that there was a deposition of 39.4% and that there was an absorption of 98.5% by the leather. The leather was removed from the mill and was washed by immersion in water. No deposit was noted on either the leather or the surface of the mill. The leather was then cured by means of a cumene hydroperoxide emulsion after which it was staked and finished according to standard practice. The distribution of the polymer was determined by micro methods. The polymer was found to be evenly deposited throughout the leather without agglomerates or layer deposition.

The water vapor permeability of the leather was 1100 g. water/m.$^2$/24 hrs. Untreated leather of the same type measured about 1800 g. water/m.$^2$/24 hrs. The water repellency of the leather as measured by the Maeser Dynamic Water Penetration Machine was 16% water absorbed and transmitted. Untreated leather of the same type measured about 350–400% water absorbed and transmitted.

*Example 7*

A cowbelly weighing 375 grams on a dry weight basis which had been tanned with "Politan" synthetic tannage, neutralized to pH 4.8 and dyed black was fat-liquored with 40 grams of sulfated oils (80% neat's-foot oil and 20% castor oil). The hide was washed, drained, rolled wet and allowed to remain rolled and wrapped in waterproof paper for several days. It was then placed in water at room temperature overnight. The hide was brought to a temperature of 55–60 degrees C. by tumbling in the leather mill with hot water for 30–40 minutes. The hide was then treated with 600 grams of an emulsion of "Thiokol LP-2" made as described in part (b) of Example 1, which had been diluted with 3000 grams of water. The leather and the emulsion were tumbled for 1 hour in the leather mill. The emulsion exhausted gradually over the period of tumbling. The hide was removed from the mill. No deposit was noted on the leather or the surface of the mill. The hide was washed with water. Then it was placed in a room at 55–60 degrees C. for 30 hours. The leather was then staked and finished according to standard practice.

The total spent liquor was analyzed and was found to have a pH of 5.20 and to contain no solids. The absorption of the polymer was, therefore, 100% and the deposition was 33%. Micro-sections of the leather were prepared as in Example 1 and the deposition of the polymer was found to be all through the leather as an even film over the fiber bundles.

The water vapor permeability of the leather was 750 g. water/m.$^2$/24 hrs. or 50% of that of untreated leather. The water repellency of the leather as measured by the Maeser Dynamic Water Penetration Machine was about 70% water absorbed and transmitted while untreated leather of the same type measured about 400% water absorbed and transmitted. The physical characteristics of the treated leather were much superior to a sample of the same leather finished by standard methods. The leather made pursuant to this example had characteristics similar to leather made from the more desirable parts of the hide.

*Example 8*

(a) A cowbelly weighing 374 grams on a dry weight basis which had been tanned with "Politan" synthetic tannage, neutralized to pH 5.3 and dyed black was fat-liquored with 40 grams of sulfated oils (80% neat's-foot oil and 20% castor oil). The hide was washed, drained, rolled wet and allowed to remain rolled and wrapped in waterproof paper for two days. It was then placed in water at room temperature for 24 hours. The hide was brought to a temperature of 55–60 degrees C. by tumbling in the leather mill with hot water for 1 hour.

(b) 728 grams of an emulsion of polymerized methacrylate monomers, prepared as described in part (b) of Example 3, were diluted with 2184 grams of warm water and the diluted emulsion heated to 60 degrees C. and then placed in the mill with the warm leather. The leather and the emulsion were then allowed to tumble for 1 hour at the end of which time 2 ml. of formic acid were added and the tumbling was continued for another 10 minutes.

The pH of the spent liquor was 3.25. The whole spent liquor was analyzed but no solids were recovered from it. The deposition of the polymer was 40% and the absorption 100%. Micro-sections were made of the leather after it had been dried and staked in the usual manner. The sections were stained with the phenylhydrazine stain for acrylates and methacrylates as in Example 3 and the polymer was found to be deposited all through the leather with a slightly thicker deposition near the flesh surface than in other parts of the leather.

The water vapor permeability of the leather was 890 g. water/m.$^2$/24 hrs. which is 25% of that of untreated leather. The water repellency of the leather as measured by the Maeser Dynamic Water Penetration Machine was 25% water absorbed and transmitted while untreated leather of the same type measured about 400% water absorbed and transmitted.

*Example 9*

A piece of "Orotan" tanned veal hide weighing 367 grams on a dry weight basis which had been neutralized to pH 4.3 and was not dyed was fat-liquored with 18.2 grams of sulfated oils (90% neat's-foot oil and 10% sulfated cod oil). The hide was then washed, drained, rolled wet and allowed to remain rolled for several days. It was then placed in water at room temperature overnight. The hide was brought to a temperature of 55–60 degrees C. by tumbling in the leather mill with hot water. Then the water was drained and 560 grams of an emulsion of "Thiokol LP-2" polymer, prepared according to the directions of part (b) of Example 1, diluted with 1740 grams of warm water and all heated to a temperature of 60 degrees C. were added. The pH of this emulsion was 8.22. The leather and the emulsion were tumbled for 1 hour in the leather mill. The emulsion was gradually absorbed and at the end of the run the spent liquor was clear and contained no solids. The pH of the spent liquor was 3.85. The hide was removed from the mill. No deposit was noted either on the leather or on the sides of the mill. It was then placed in a room at 55–60 degrees C. for 30 hours. The leather was then staked and finished according to standard practice. The deposition obtained was 30% and the absorption 100%. The leather was examined by the microscopical method of Example 1. The polymer was found to be deposited about ¼ of the way through the leather from both the flesh and grain sides. There was no agglomeration of the polymer.

The water vapor permeability of this leather was 850 g. water/m.$^2$/24 hrs. The water repellency as measured by the Maeser Dynamic Water Penetration Machine was about 50% of water absorbed and transmitted.

*Example 10*

Two wet steer sides, previously chrome-tanned and vegetable retanned according to army specifications, and together weighing 5561 grams (on the dry basis) were preconditioned by depositing therein 4% of a fatty mixture, such as disclosed, for instance, in Example 9, and then crusted and allowed to remain until ready for treatment. The steer sides were then treated with 17 gallons of a "Thiokol LP-2" emulsion containing 1200 grams of solids, said emulsion having a pH of 6.8, and treatment of the leather being carried out at a temperature of 60 degrees C. The exhaustion was gradual. A 21% deposition was obtained with no deposition of the emulsion on the exterior surfaces of the leather or on the walls of the barrel or drum. Samples were taken before and after exhaustion and, by difference, 1160 grams of solids were deposited into the leather. The following table shows the results of the treatment.

| Butt (Average) | Belly (Average) | Transmitted and Absorbed Water Repellency (Per 10,000 Flexes) | | |
|---|---|---|---|---|
| | | | 1st Cycle | 2d Cycle | 3d Cycle |
| 1,234 | 808 | Butt | 56 | 53 | 42 |
| | | Belly | 38 | 28 | 20 |

*Example 11*

A piece of undyed sole leather weighing 232 grams on a dry weight basis, which had been vegetable tanned and neutralized to pH 3.42, was fat-liquored so as to deposit in said leather 18 grams of sulfated neat's-foot oil and 5 grams of sulfated castor oil. The leather was kept in tap water for about 24 hours. It then was brought to a temperature of 55–60 degrees C. by tumbling it in the leather mill with hot water for 30–40 minutes. Then the water was drained and 348 grams of an emulsion prepared according to the directions given in part (b) of Example 2, diluted with 1392 grams of water and all heated to a temperature of 60 degrees C., were added. The leather and the emulsion were tumbled for 1 hour in a leather mill having 24–28 R. P. M. and, at the end of the hour, the leather was removed from the mill. No deposition was noted either on the surface of the leather or on the sides of the mill.

The hide was placed in a room at 55–60 degrees C. for 30 hours and then finished according to standard practice. The total spent liquor, having a pH of 6.88, was analyzed. Of the total solids used in the original emulsion, 8.3 grams were left in the spent liquor or 88% absorption was obtained on a deposition of 26%.

*Example 12*

(a) A piece of leather weighing 919.6 grams on a dry weight basis, which had been tanned with "Politan" synthetic tannage, was fat-liquored to deposit therein 80 grams of sulfated neat's-foot oil and 12 grams of sulfated castor oil. The leather was then brought to a temperature of 55–60 degrees C. by tumbling in a leather mill with hot water for 30–40 minutes. Then the water was drained.

(b) 144 grams of methacrylate polymer (see column 13, lines 64–75 in Example 3) were dissolved in 144 grams of xylene. To this solution, 144 grams of base (mixture of 36.5 parts cumar, 41.5 parts oiticica oil, 13.5 parts linseed oil and 8.5 parts paraffin wax, prepared as described above) also dissolved in 144 grams of xylene were added. Then 112 grams of a plasticizer were added (equal parts of "Indopol 2–100" and "H–50"). Finally to this mixture an additional amount of 144 grams of xylene were added. In a separate container, 36 grams of a non-ionic phosphoric acid ester emulsifier ("Victawet 12," Victor Chemical Works, Chicago Heights, Illinois) were dissolved in 1132 grams of warm water. The two solutions were then mixed and the whole mixture was passed through a colloid mill at 11,000–12,000 R. P. M. This gave 2000 grams of emulsion of approximately 20% solids, pH 6.7.

The leather and the diluted emulsion were tumbled in the leather mill as described in Example 11. The spent liquor of pH 5.2 was analyzed and 3.5 grams of solids were recovered, thus showing 98.5% absorption and a deposition of 24.6%.

The water repellency as measured by the Maeser Dynamic Water Penetration Machine was 22.9% water absorbed and 1.46 grams transmitted, while the untreated leather of the same type measured about 81.2% water absorbed and 3.77 grams transmitted.

*Example 13*

(a) A piece of steerhide weighing 2038 grams on a dry weight basis which had been chrome-tanned and neutralized to pH 3.25 and dyed black was fat-liquored so as to deposit therein 81.5 grams of a mixture of 65 grams of sulfated neat's-foot oil and 16.5 grams of sulfated castor oil. The hide was then washed, drained, rolled wet and allowed to remain rolled and wrapped in waterproof paper for four days. It was then placed in water at room temperature overnight. The hide was brought to a temperature of 55–60 degrees C. by tumbling in a wooden leather mill with hot water for 30–40 minutes and then the water was drained off.

(b) 574 grams of "Thiokol LP-2" polymer were dissolved in 525 grams of toluene and 525 grams of xylene. To this solution 126 grams of plasticizer ("Indopol L-100") were added. In a separate container, 49 grams of emulsifier (same as that used in part (b) of Example 1) were melted and dissolved in 1694 grams of warm water. The two solutions were then mixed and the whole mixture was passed through a colloid mill at 11,000–12,000 R. P. M. This gave 3500 grams of emulsion of approximately 20% solids with a pH of 8.34.

(c) The leather and 2550 grams of the emulsion of part (b) diluted with 7650 grams of water, heated to 60 degrees C., were tumbled for 60 minutes in a leather mill having 24–28 revolutions per minute. After 10 minutes it became evident that there was a gradual exhaustion. At the end of the 60 minutes the hide was removed from the mill. No deposition was noted either on the surface of the leather or on the sides of the mill. 3 cc. of formic acid were added and the tumbling continued for 10 more minutes. The hide was washed by immersing in water. Then it was placed in a room at 55–60 degrees C. for 30 hours. Then the leather was pasted and finished according to standard practice.

The total spent liquor of pH 3.74 was analyzed by acidification and evaporation. Of the total solids used in the original emulsion, 40.5 grams were left in the spent liquor or 90.2% absorption was obtained, or a deposition of 23%. The distribution of the polymer was even throughout the leather, and without agglomerates or layers.

The water vapor permeability of the leather was 1165 g. water/m.$^2$/24 hrs. as against that of an army specification leather (380–500 g. water/m.$^2$/24 hrs.). The water repellency as measured by the Maeser Dynamic Water Penetration Machine was 29.7% of water absorbed and transmitted while untreated army specification leather of the same type is about 20% absorption and 20 to 60% transmission.

*Example 14*

(a) Two steersides which had been chrome-tanned and then vegetable retanned (upper leather), weighing wet 13,900 grams, calculated dry weight 5561.5 grams, were utilized. The sides were initially preconditioned to deposit therein approximately 4%, by weight on the dry basis, of sulfated oils as described in part (a) of Example 1. The sides were then allowed to stand for six days, covered so as to prevent drying out. The sides were then tumbled in water at about 60 degrees C. for 30 minutes so as to loosen the fibers. The drum or barrel was then drained.

(b) To the drum or barrel 6000 grams of emulsion,[1] diluted to 11 gallons, at a temperature of about 60 degrees C. were added and the barrel and the two steersides were tumbled for about 1 hour. The mill was then stopped. An examination showed no deposition of polymer on either the walls of the drum or barrel or on the surfaces of the steersides. The steersides were then removed, allowed to drain, and then pasted and finished according to usual tannery procedures.

(c) The water vapor permeability was 1050 g. water/m.²/24 hrs. as against an army specification of 30% grease stuffed leather of 450 g. water/m.²/24 hrs. The average combined transmission and absorption, 3 cycles of 10,000 flexes each while immersed in water, was 35% as against 125% to 225% of the weight of the leather for an army specification leather.

*Example 15*

(a) A steerside which had been chrome-tanned and dyed black, weighing wet 6355 grams, calculated dry weight 2542 grams, was used. It was treated as described in part (a) of Example 14.

(b) To the drum or barrel 3000 grams of emulsion,[2] diluted to 8 gallons, at a temperature of about 60 degrees C. were added and the steerside was tumbled for about 1 hour. The mill was then stopped. An examination showed no deposition of polymer on either the walls of the drum or barrel or on the surface of the steerside. The steerside was then removed, allowed to drain, and then dried and finished according to usual tannery procedures.

(c) The water vapor permeability was 1120 g. water/m.²/24 hrs. and the water transmission was 39% when measured as described in part (c) of Example 14.

This application is a continuation-in-part of my prior application Serial No. 6,802, filed February 8, 1948, now abandoned.

What I claim as new and desire to protect by Letters Patent of the United States is:

1. In a method of impregnating leather to deposit within the interfiber space therein sufficient elastomeric material to increase substantially the water resistance of said leather without, however, decreasing the water vapor permeability thereof to an objectionable degree, the steps which comprise adjusting the pH of the tanned leather to within the range of about 3 to about 5.5, preconditioning said leather by depositing therein several per cent, by weight, of at least one member selected from the group consisting of sulfated and sulfonated animal and vegetable oils, washing said leather in water, draining off the wash water, rolling the leather while wet and maintaining it rolled for at least 24 hours, then tumbling said leather while warm with a warm emulsion containing, by weight, from about 2% to 5% of a polymerized elastomeric material, from about 90% to 95% of water, from about 3% to 5% of a volatile water-immiscible predominately non-polar organic solvent, from 0% to 1.5% of a plasticizer, and from about 0.4% to 0.7% of an emulsifier, said emulsion containing from about 2% to about 5%, by weight, of solids and having a pH between about 6.5 and 8.5, the leather being tumbled until the emulsion is substantially exhausted of depositable solids, and then drying said impregnated leather.

2. In a method of impregnating leather to deposit within the interfiber space therein sufficient elastomeric material to increase substantially the water resistance of said leather without, however, decreasing the water vapor permeability thereof to an objectionable degree, the steps which comprise adjusting the pH of the tanned leather to within the range of about 3 to about 5.5, preconditioning said leather by depositing therein several per cent, by weight, of at least one member selected from the group consisting of sulfated and sulfonated animal and vegetable oils, washing said leather in water, and tumbling said leather while warm with a warm emulsion containing from about 2% to 5%, by weight, of a partially polymerized elastomeric material (molecular weight 3000–8000) from about 90% to 95% of water, from about 3% to 5% of a volatile water-immiscible predominately non-polar organic solvent, from 0% to 1.5% of a plasticizer, and from about 0.4% to 0.7% of an emulsifier, said emulsion containing from about 2% to about 5%, by weight, of solids and having a pH between about 6.5 and 8.5, the leather being tumbled until the emulsion is substantially exhausted of depositable solids, and then curing said impregnated leather.

3. In a method of impregnating leather to deposit within the interfiber space therein sufficient elastomeric material to increase substantially the water resistance of said leather without, however, decreasing the water vapor permeability thereof to an objectionable degree, the steps which comprise adjusting the pH of the tanned leather to within the range of about 3 to about 5.5, preconditioning said leather by depositing therein several per cent, by weight, of at least one member selected from the group consisting of sulfated cod and sulfated neats'-foot oils, washing the said leather in water, draining off the wash water, rolling the leather while wet and maintaining it rolled for at least 24 hours, then tumbling said leather while warm with a warm emulsion containing, by weight, about 3% to 5% of a partially polymerized alkylene polysulfide elastomeric material, from about 90% to 95% of water, from about 3% to 5% of a volatile water-immiscible organic solvent containing predominately at least one member selected from the group consisting of xylene and toluene, from 0% to 1.5% of a plasticizer, and from 0.4% to 0.7% of an emulsifier, said emulsion containing from about 3% to about 5%, by weight, of solids and having a pH between about 6.5 and 8.5, the leather being tumbled until the emulsion is substantially exhausted of depositable solids, and then curing said impregnated leather.

4. In a method of impregnating leather to deposit within the interfiber space therein sufficient elastomeric material to increase substantially the water resistance of said leather without, however, decreasing the water vapor permeability thereof to an objectionable degree, the steps which comprise providing a tanned leather having a pH within the range of about 3 to about 5.5, said leather having also been preconditioned by depositing therein several per cent, by weight, of at least one member selected from the group consisting of sulfated and sulfonated animal and vegetable oils, tumbling said leather with an emulsion containing, by weight, from about 2% to 5% of a polymerized elastomeric material, from about 90% to 95% of water, from about 3% to 5% of a volatile water-immiscible predominately non-polar organic solvent, from 0% to 1.5% of a plasticizer, and from about 0.4% to 0.7% of an emulsifier, said emulsion containing from about 2% to about 5%, by weight, of solids and having a pH between about 6.5 and 8.5, the leather being tumbled until the emulsion is substantially exhausted of

---

[1] 173 grams lauryl methacrylate, 86 grams octyl methacrylate, 86 grams butyl methacrylate, and 86 grams styrene were polymerized in the manner described in Example 3. The resulting polymer was mixed with 432 grams of an oiticica oil-linseed oil-cumar-paraffin wax mixture prepared as described above, 336 grams of the "Indopol" plasticizer previously described, 108 grams of "Victawet 12," 1296 grams xylol, and 3396 grams water.
After dilution with water to 11 gallons, the pH was 6.8. After treatment of the steersides, the pH of the spent liquor was 5.2.
The amount of solids in the spent liquor was 36 grams, the emulsion was 97% exhausted, and there was a deposition of 21% solids in the leather.

[2] 216 grams lauryl methacrylate, 108 grams octyl methacrylate, 108 grams butyl methacrylate, and 108 grams styrene were polymerized in the manner described in Example 3. The resulting polymer was mixed with 480 grams "Thiokol LP-2" polymer, 180 grams of the "Indopol" plasticizer previously described, 48 grams "Victawet 12," 48 grams of Emulsifier A (see above table), 1800 grams xylene, and 2904 grams water.
The amount of solids in the spent liquor was 60 grams, the emulsion was 90.5% exhausted, and there was a deposition of 21.2% solids in the leather.

depositable solids, and then drying said impregnated leather.

5. In a method of impregnating leather to deposit within the interfiber space therein sufficient alkylene polysulfide elastomeric material to increase substantially the water resistance of said leather without, however, decreasing the water vapor permeability thereof to an objectionable degree, the steps which comprise adjusting the pH of the tanned leather to within the range of about 3 to about 5.5, preconditioning said leather by depositing therein several per cent, by weight, of at least one member selected from the group consisting of sulfated and sulfonated animal and vegetable oils, washing said leather in water, draining off the wash water, rolling the leather while wet and maintaining it rolled for at least 24 hours, then tumbling said leather while warm with a warm emulsion containing, by weight, from about 3% to 5% of a partially polymerized alkylene polysulfide elastomeric material, from about 90% to 95% of water, from about 3% to 5% of a volatile water-immiscible predominately hydrocarbon organic solvent, from 0% to 1.5% of a plasticizer, and from about 0.4% to 0.7% of a nonionic emulsifier, said emulsion containing from about 3% to about 5%, by weight, of solids and having a pH between 6.5 and 8.5, the leather being tumbled until the emulsion is substantially exhausted of depositable solids, and then curing said impregnated leather.

6. In a method of impregnating leather to deposit within the interfiber space therein sufficient elastomeric material to increase the weight of the leather by from 5% to 40% and to increase substantially the water resistance of said leather without, however, decreasing the water vapor permeability thereof below about 600 grams per square meter/24 hours at 35–36 degrees C. and 95 per cent relative humidity, the steps which comprise providing a tanned leather having a pH within the range of about 3 to about 5.5, said leather having also been preconditioned by depositing therein several per cent, by weight, of at least one member selected from the group consisting of sulfated and sulfonated animal and vegetable oils, tumbling said leather with an emulsion containing, by weight, from about 2% to 5% of a partially polymerized alkylene polysulfide elastomeric material, from about 90% to 95% of water, from about 3% to 5% of a volatile water-immiscible predominately non-polar hydrocarbon organic solvent, from 0% to 1.5% of a plasticizer, and from about 0.4% to 0.7% of an emulsifier, said emulsion containing from about 2% to about 5%, by weight, of solids and having a pH between about 6.5 and 8.5, the leather being tumbled until the emulsion is substantially exhausted of depositable solids, and then curing said impregnated leather.

7. In a method of impregnating vegetable retan leather to deposit within the interfiber space therein sufficient elastomeric material to increase the weight of the leather by from 5% to 40% and to increase substantially the water resistance of said leather without, however, decreasing the water vapor permeability thereof below about 600 grams per square meter/24 hours at 35–36 degrees C. and 95 per cent relative humidity, the steps which comprise providing a tanned leather having a pH within the range of about 3 to about 5.5, said leather having also been preconditioned by depositing therein several per cent, by weight, of at least one member selected from the group consisting of sulfated and sulfonated animal and vegetable oils, tumbling said leather with an emulsion containing, by weight, at least 2% of a partially polymerized elastomeric material, in excess of 50% of water, a minimum of about 3% of a volatile water-immiscible predominately non-polar organic solvent, from 0% to 5% of a plasticizer, and from about 0.4% to 2% of a nonionic emulsifier, said emulsion having a pH between about 6.5 and 8.5, the leather being tumbled until the emulsion is substantially exhausted of depositable solids, and then curing said impregnated leather.

8. In a method of impregnating leather to deposit within the interfiber space therein sufficient elastomeric material to increase the weight of the leather by from 5% to 40% and to increase substantially the water resistance of said leather without, however, decreasing the water vapor permeability thereof below about 900 grams per square meter/24 hours at 35–36 degrees C. and 95 per cent relative humidity, the steps which comprise providing a tanned leather having a pH within the range of about 3 to about 5.5, said leather also having been treated to reduce the content of water soluble salts therein to below about 500 mg. per 100 grams of leather on the dry basis, and said leather also having been preconditioned by depositing therein several per cent, by weight, of at least one member selected from the group consisting of sulfated and sulfonated animal and vegetable oils, washing said leather in water, draining off the wash water, rolling the leather while wet and maintaining it rolled for at least 24 hours, then tumbling said leather with an emulsion containing, by weight, from about 2% to 5% of a partially polymerized methacrylate elastomeric material, from about 90% to 95% of water, from about 3% to 5% of a volatile water-immiscible predominately non-polar organic solvent, from 0% to 1.5% of a plasticizer, and from about 0.4% to 0.7% of an emulsifier, said emulsion containing from about 2% to about 5%, by weight, of solids and having a pH between about 6.5 and 8.5, the leather being tumbled until the emulsion is substantially exhausted of depositable solids, and then curing said impregnated leather.

9. An emulsion for the treatment of leather comprising the following ingredients in approximately the following proportions by weight:

| | Percent |
|---|---|
| Polymerized elastomeric material | 10–30 |
| Water | 40–60 |
| Volatile, water-immiscible predominately non-polar organic solvent | 10–40 |
| Plasticizer | 0–10 |
| Emulsifier | 0.5–3 |

10. An emulsion for the treatment of leather comprising the following ingredients in approximately the following proportions by weight:

| | Percent |
|---|---|
| Partially polymerized alkylene polysulfide elastomeric material (molecular weight 3000–8000) | 15–20 |
| Water | 48–55 |
| Volatile, water-immiscible predominately hydrocarbon organic solvent | 20–30 |
| Plasticizer | 0–5 |
| Nonionic emulsifier | 1–2 |

11. An emulsion for the treatment of leather comprising the following ingredients in approximately the following proportions by weight:

| | Percent |
|---|---|
| Partially polymerized elastomeric material (molecular weight 3000–8000) | 17 |
| Water | 53.4 |
| Volatile, water-immiscible predominately non-polar organic solvent | 25 |
| Plasticizer | 3 |
| Emulsifier | 1.6 |

12. An emulsion for the treatment of leather, said emulsion having a pH between about 6.5 and 8.5 and comprising the following ingredients in approximately the following proportions by weight:

| | Percent |
|---|---|
| Polymerized elastomeric material | 2.5 |
| Water | 90–95 |
| Volatile, water-immiscible predominately non-polar organic solvent | 3–5 |
| Plasticizer | 0–1.5 |
| Emulsifier | 0.4–0.7 |

13. An emulsion for the treatment of leather, said emulsion having a pH between about 6.5 and 8.5 and comprising the following ingredients in approximately the following proportions by weight:

| | Percent |
|---|---|
| Partially polymerized alkylene polysulfide elastomeric material (molecular weight 3000–8000) | 2–5 |
| Water | 90–95 |
| Volatile, water-immiscible predominately non-polar organic solvent | 3–5 |
| Plasticizer | 0–1.5 |
| Nonionic emulsifier | 0.4–0.7 |

14. Leather carrying substantially throughout its interfiber space an elastomeric material exclusive of silicon amine polymeric resins, in oriented deposition, which is present in amounts sufficient to increase the weight of said leather by from 5% to 40%, said treated leather having a materially enhanced resistance to water and to wear in comparison with the untreated leather, and said treated leather having a water vapor permeability of not substantially less than 900 grams per square meter/24 hours at 35–36 degrees C. and 95 per cent relative humidity.

15. Leather carrying substantially throughout its interfiber space an alkylene polysulfide elastomeric material, in oriented deposition, which is present in amounts sufficient to increase the weight of said leather by from 5% to 40%, said treated leather having a materially enhanced resistance to water and to wear in comparison with the untreated leather, and said treated leather having a water vapor permeability of not substantially less than 900 grams per square meter/24 hours at 35–36 degrees C. and 95 per cent relative humidity said leather being essentially free of silicon amine polymeric resins.

16. Leather carrying substantially throughout its interfiber space, in oriented deposition, at least one member selected from the group consisting of acrylate polymers and copolymers of acrylates in which the monomer copolymerized with the acrylate monomer does not exceed about 5 per cent, by weight, of the latter, said polymer and/or copolymer being present in amounts sufficient to increase the weight of said leather by from 5% to 40%, said treated leather having a materially enhanced resistance to water and to wear in comparison with the untreated leather, and said treated leather having a water vapor permeability of not substantially less than 900 grams per square meter/24 hours at 35–36 degrees C. and 95 per cent relative humidity, said leather being essentially free of silicon amine polymeric resins.

17. Leather carrying substantially throughout its interfiber space several per cent, by weight, of at least one member selected from the group consisting of sulfated and sulfonated animal and vegetable oils, and an elastomeric material exclusive of silicon amine polymeric resins, in oriented deposition, in amounts sufficient to increase the weight of said leather by from 5% to 40%, said treated leather having a materially enhanced resistance to water and to wear in comparison with the untreated leather, and said treated leather having a water vapor permeability of not substantially less than 900 grams per square meter/24 hours at 35–36 degrees C. and 95 per cent relative humidity.

18. Leather in accordance with claim 17, wherein the content of water-soluble salts is below about 500 mg. per 100 grams of said leather on the dry basis.

References Cited in the file of this patent

UNITED STATES PATENTS

| | | |
|---|---|---|
| 1,285,144 | Haring | Nov. 19, 1918 |
| 1,292,282 | Evans | Jan. 21, 1919 |
| 1,942,146 | Kollek et al. | Jan. 2, 1934 |
| 2,191,654 | Haon | Feb. 27, 1940 |
| 2,290,794 | Alvarado et al. | July 21, 1942 |
| 2,413,806 | Virtue | Jan. 7, 1947 |
| 2,452,536 | Kirk | Nov. 2, 1948 |
| 2,544,691 | Kugler et al. | Mar. 13, 1951 |
| 2,590,017 | Knight | Mar. 18, 1952 |
| 2,635,059 | Cheronis | Apr. 14, 1953 |
| 2,635,060 | Cheronis et al. | Apr. 14, 1953 |